No. 856,147. PATENTED JUNE 4, 1907.
W. S. HAYDEN.
FERTILIZER SPREADER.
APPLICATION FILED AUG. 25, 1906.
4 SHEETS—SHEET 2.
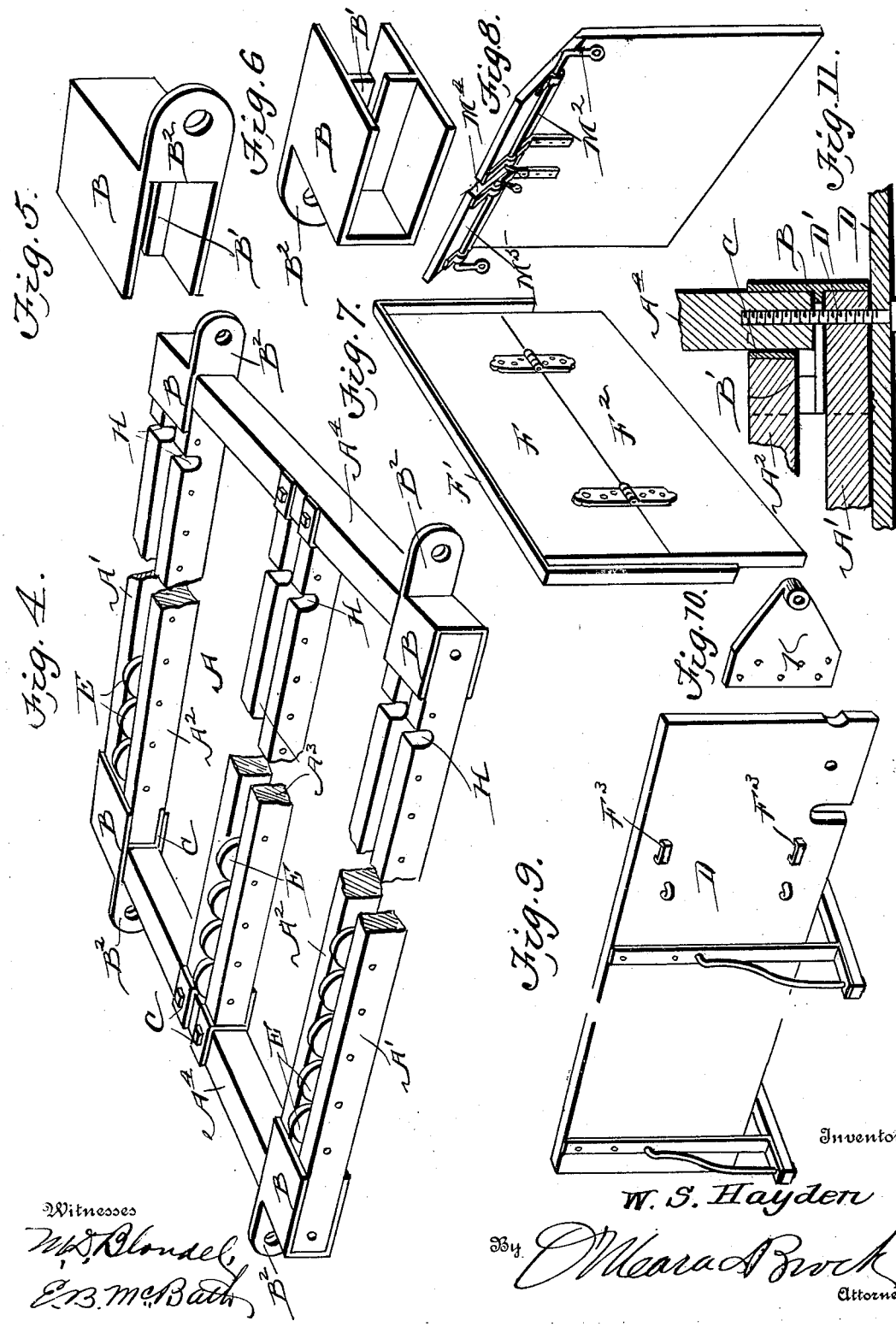
Witnesses
Inventor
W. S. Hayden
By O'Meara & Brock
Attorneys

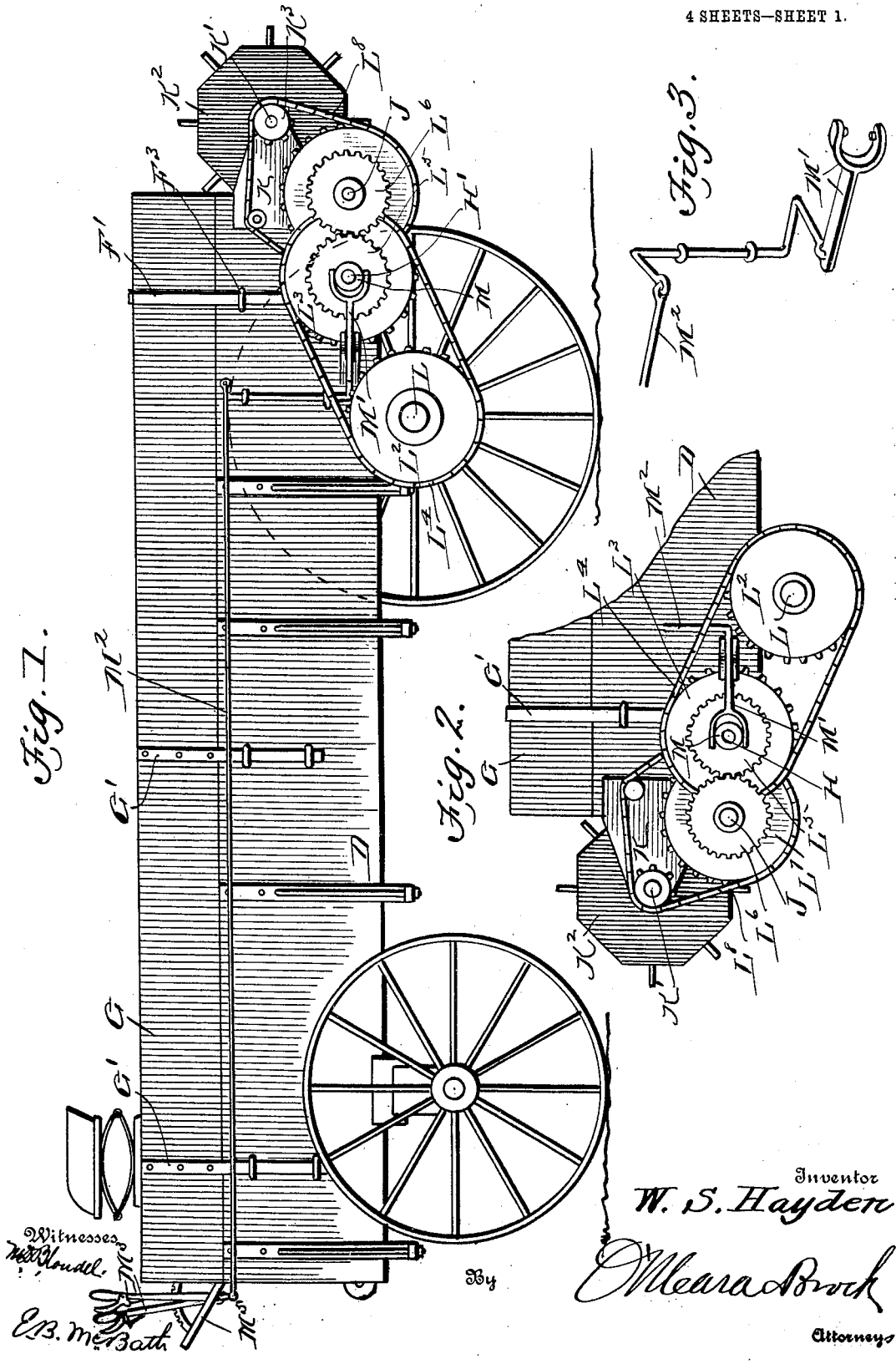

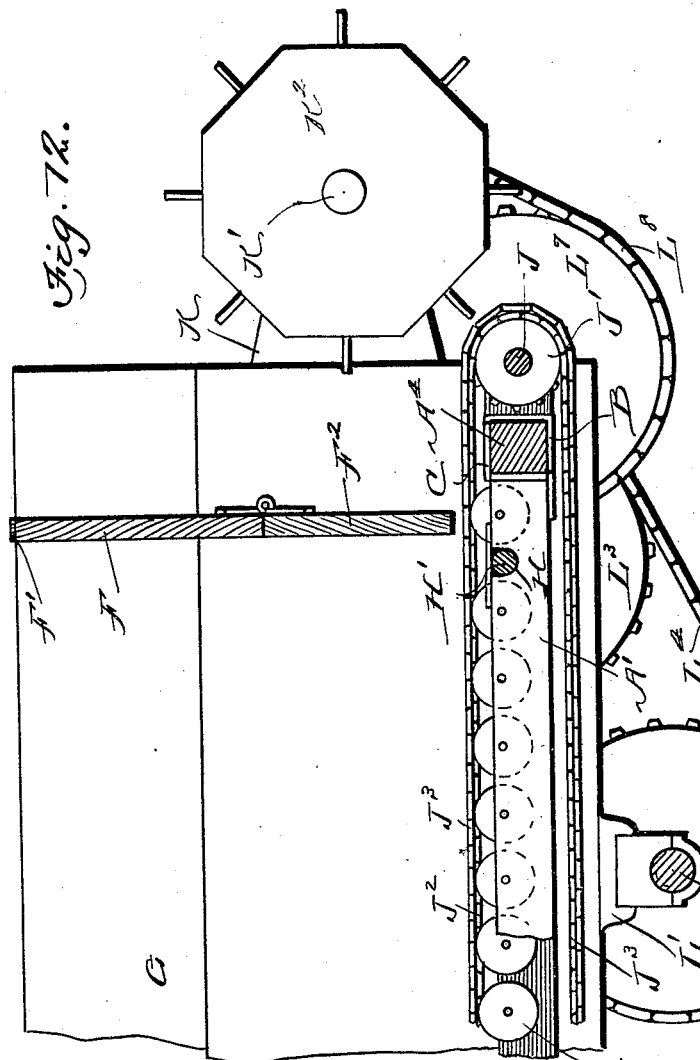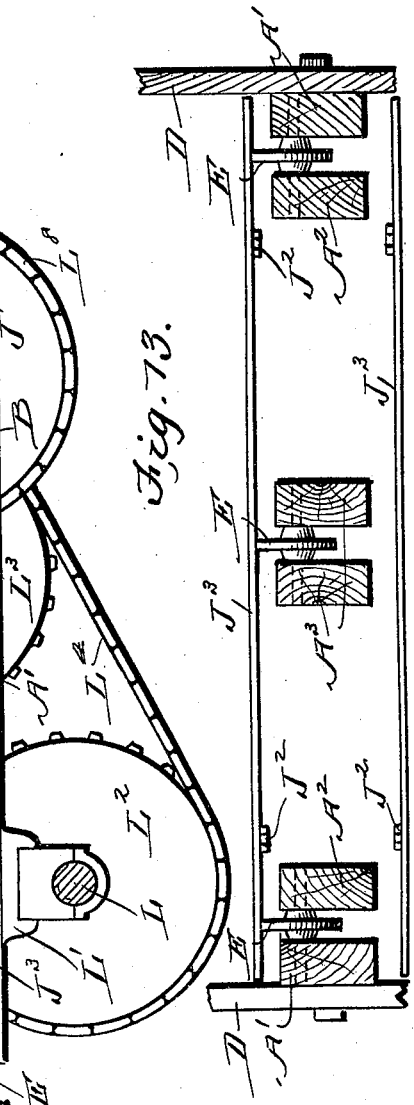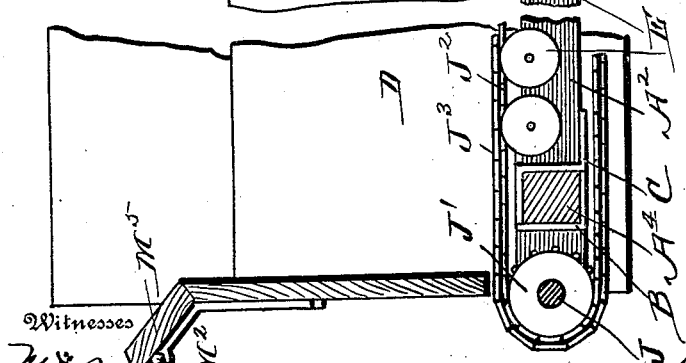

No. 856,147. PATENTED JUNE 4, 1907.
W. S. HAYDEN.
FERTILIZER SPREADER.
APPLICATION FILED AUG. 25, 1906.

4 SHEETS—SHEET 4.

Witnesses
Inventor
W. S. Hayden
By O'Meara Buck
Attorney

UNITED STATES PATENT OFFICE.

WINFIELD S. HAYDEN, OF PALMYRA, MISSOURI.

FERTILIZER-SPREADER.

No. 856,147.  Specification of Letters Patent.  Patented June 4, 1907.

Application filed August 25, 1906. Serial No. 332,046.

*To all whom it may concern:*

Be it known that I, WINFIELD S. HAYDEN, a citizen of the United States, residing at Palmyra, in the county of Marion and State of Missouri, have invented a new and useful Improvement in a Fertilizer-Spreader, of which the following is a specification.

This invention is a fertilizer distributer and the object of the invention is a device of this kind which can be applied to an ordinary farm wagon by removing the usual bed of the latter, thereby saving the expense of purchasing a complete wagon with running gear.

Figure 14:
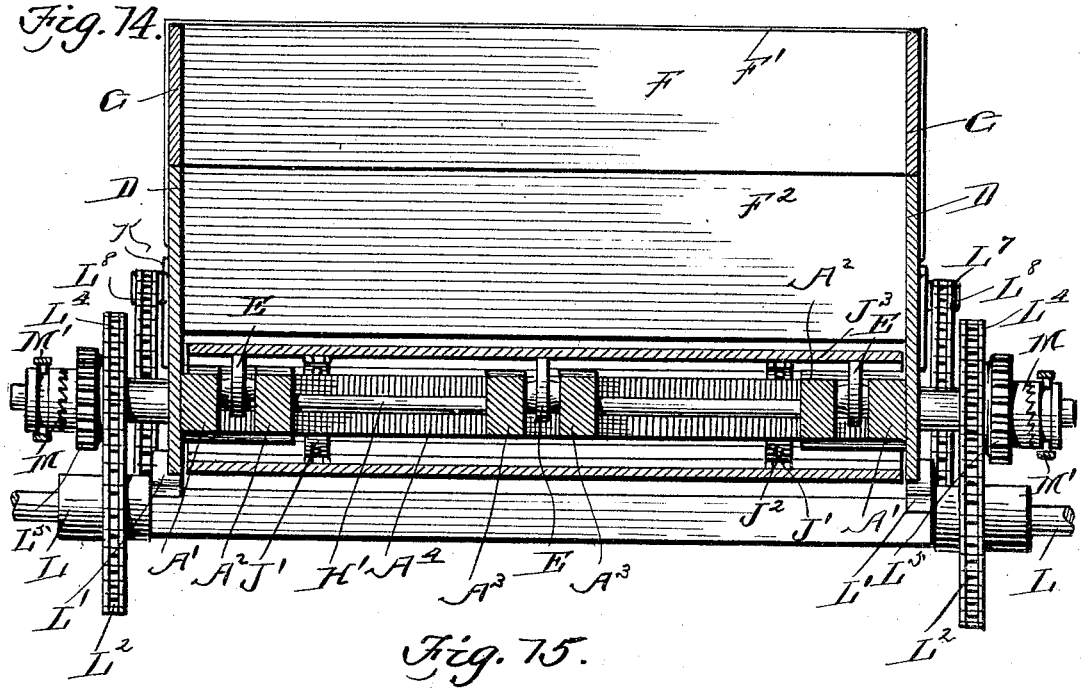
Figure 15:
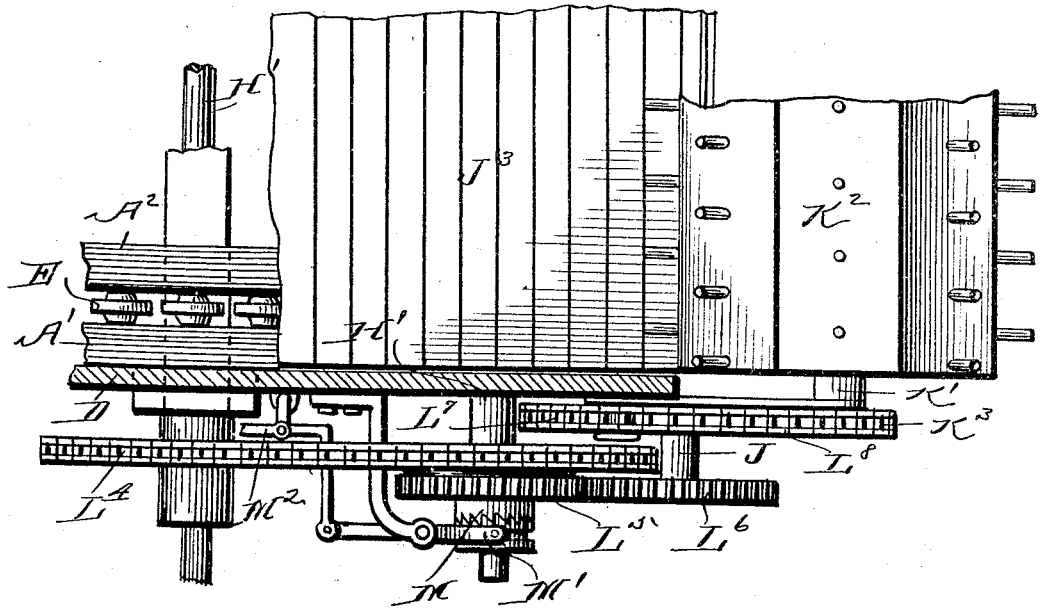

The invention consists in a device of this kind constructed as hereinafter described, pointed out in the claims and shown in the accompanying drawings, in which, Figure 1 is a side view of a complete device. Fig. 2 is a view of the gearing in elevation, upon the opposite side of the wagon from that shown in Fig. 1. Fig. 3 is a detail perspective view of the clutch operating mechanism. Fig. 4 is a detail perspective view of the framework the central portion being broken out. Figs. 5 and 6 are perspective views of corner boxes. Fig. 7 is a perspective view of a tail gate. Fig 8 is a perspective view of the front end of the wagon body. Fig. 9 is a perspective view of a side of the wagon body centrally cut out. Fig. 10 is a perspective view of a bearing plate. Fig. 11 is a sectional view taken horizontally through a corner portion of the frame and through one of the boxes. Fig. 12 is a longitudinal section taken through the frame and wagon body at a point adjacent one side. Fig. 13 is a transverse section through the frame, one side being also shown in section.
Fig. 14 is a transverse sectional view looking toward the rear end of the wagon. Fig. 15 is a plan view of a rear corner portion of the device, the gearing being shown in plan, parts being broken away and one side being shown in section.

In building my device I construct a frame A which consists of outer side members A', side members $A^2$ parallel to and spaced from the members A' and centrally parallel members $A^3$ running lengthwise of the frame. I also employ end members $A^4$. The frame is secured together at the corners by means of boxes B, which are divided into two sections by a partition B' and each of which is provided with one outwardly extending perforated lug $B^2$. The end portions of the members A' and $A^4$ fit into the compartments of the boxes B and the lugs $B^2$ of the front boxes extend forwardly and those of the rear boxes extend rearwardly. The members $A^2$ and $A^3$ of the frame A are secured in position and connected to the members $A^4$ by means of angled plates C. The wagon sides D complete the frame work of the device. Between the members A' and $A^2$ and between the two central members $A^3$ of the frame are journaled a plurality of rollers E, adapted to support a traveling apron which will be described hereafter.

The tail gate of the fertilizer distributer comprises a fixed upper section F carried by a rectangular bracket F' and to the stationary section F is hinged a gate $F^2$. The vertical members of the bracket F' are spaced slightly apart from the ends of the section F in order to permit supplemental side pieces G, to be placed upon the side members D. The bracket F' permits the use of the end gate either with or without these additional side members, the vertical portions of the bracket extending down over the sides D and being held in clips $F^3$.

The supplemental sides G are held in place partly by the tail gate and bracket F' and also by suitable stanchions G'. The longitudinal members of the frame A are cut out as shown at H and form suitable bearings for a shaft H'. This shaft carries gearing to be described hereafter which gearing drives the shafts J journaled respectively in the front and rear lugs $B^2$ of boxes B and upon which are mounted sprocket wheels J' over which run sprocket chains $J^2$. An apron formed of slats $J^3$ is carried by the chains $J^2$ and this apron rests upon the roller E. Plates K are carried by the sides D and project to the rear of the same and these plates terminate in suitable bearings in which is journaled the shaft K' and upon this shaft is mounted a beater or distributer $K^2$. The wagon body above described is mounted upon axles L of the ordinary form of wagon running gearing by means of suitable supports L'. Upon the axle L is mounted upon each side of the wagon a sprocket wheel $L^2$ which is secured to the spokes of the wheel in any desired manner or may be secured if preferred to the wheel hub.

Upon the ends of the shaft H are sprocket wheels $L^3$ and sprocket chains $L^4$ run over these wheels and transmit rotation of the wagon wheels to the sprocket wheel $L^3$ and shaft H'. As the gearing upon one side of the wagon is a duplicate of that upon the other side a full description of one gearing will suffice for both. Upon the shaft H' is loosely mounted a gear wheel $L^5$ and a gear wheel $L^6$ is fixed upon the shaft J and meshes with the gear wheel $L^5$. A sprocket wheel $L^7$ is also fixed upon the shaft J and the sprocket chain $L^8$ runs over the said sprocket wheel $L^7$ and also over a sprocket wheel $K^3$ mounted upon the shaft K'.

A clutch mechanism M of the usual kind locks the gear wheel $L^5$ to the shaft H' and is operated by a clutch lever M' which in turn is operated from the front of the wagon by a suitable lever $M^3$ through a medium of connecting links $M^2$. As above stated this gearing is duplicated upon opposite sides of the wagon and in order to control each gearing independent of the other, there are two of the operating levers $M^3$ and as shown in Fig. 8 these levers are placed at the center of the front end of the wagon working through a slot $M^4$ formed in the foot board $M^5$.

It will be obvious from this construction that when the wagon is traveling in a straight line the apron which feeds the fertilizer under the hinged gate $F^2$ and to the beater $K^2$ will be driven by both sets of gearing. When however, the wagon is being turned the gearing upon the inside of the turn can be thrown out of gearing and the driving being accomplished by means of a gearing upon the opposite side. Also when the wagon is being driven upon a hillside and the weight of the load is thrown upon the wheels of the lower side the gearing upon the opposite side of the wagon can be thrown out of engagement and the pull of the apron thrown upon the gearing driven by those wheels upon which the load is resting.

Having thus fully described my invention, what I claim as new and desire to secure by Letters Patent, is:—

1. In a device of the kind described a frame consisting of side and end members, members adjacent to the side members parallel central members, corner boxes adapted to receive the ends of the side and end members, and angled plates adapted to connect the central members and the members adjacent the side members to the end members.

2. In a device of the kind described a frame consisting of side and end members, members parallel to and adjacent the side members, parallel centrally arranged members, boxes each divided into two compartments by a partition and provided with a perforated lug, the end portions of the side and end members resting in said boxes, angled plates connecting the central members of the frame to the end members, rollers mounted between adjacent parallel members, bearings formed in said last mentioned members, a shaft journaled therein, shafts carried by the lugs of the boxes, sprocket wheels upon the last mentioned shafts, sprocket chains running over said wheels, an apron carried by said wheels traveling upon the rollers, means for driving the shaft journaled in the bearings of the frame, and means for transmitting rotation of said shaft to one of the shafts having the sprocket wheels.

3. A fertilizer distributer comprising a traveling apron, a frame supporting said apron, rollers upon which the apron rests journaled in said frames, a shaft journaled in said frame, means for driving said shaft, gearing arranged upon opposite sides of the apron and adapted to drive the said apron, and means for throwing either or both of said gearings into or out of engagement with the shaft journaled in the frame.

4. In combination with a running gear a frame carried thereby, rollers journaled in the frame, a shaft journaled in the frame, boxes connecting the sides and end portions of the frame and provided with forwardly and rearwardly extending lugs respectively, shafts journaled in said lugs, sprocket wheels mounted upon said last mentioned shafts, chains running over said shafts, an apron traveling with said chains and resting upon the rollers, a sprocket wheel upon the wagon axle driven by rotation of the wagon wheel, a sprocket wheel upon the shaft journaled in the frame, sprocket chains connecting the two last mentioned sprocket wheels, a beater, a sprocket wheel upon the rear shaft carried by lugs, a sprocket wheel upon the beater, a sprocket chain running over the two last mentioned sprocket wheels, a gear wheel fixed upon the last mentioned shaft, a gear wheel loose upon the shaft journaled in the frame and meshing with the last mentioned gear wheel, and a clutch mechanism adapted to lock the loose gear wheel to its shaft, as and for the purpose set forth.

WINFIELD S. HAYDEN.

Witnesses:
J. W. PHILLIP,
FRANK H. SOSEY.